United States Patent

Halliday

(10) Patent No.: US 7,757,444 B1
(45) Date of Patent: Jul. 20, 2010

(54) SKYLIGHT SYSTEM

(75) Inventor: Michael J. Halliday, El Paso, TX (US)

(73) Assignee: Sun Bulb, Inc., El Paso, TX (US)

( * ) Notice: Subject to any disclaimer, the term of this patent is extended or adjusted under 35 U.S.C. 154(b) by 660 days.

(21) Appl. No.: 10/770,251

(22) Filed: Feb. 2, 2004

Related U.S. Application Data

(60) Provisional application No. 60/444,128, filed on Jan. 31, 2003.

(51) Int. Cl.
*E04B 7/18* (2006.01)
*E04D 13/18* (2006.01)
*G02B 17/00* (2006.01)

(52) U.S. Cl. .................. 52/200; 52/173.3; 359/592

(58) Field of Classification Search .............. 52/22, 52/200, 173.3, 72; 359/591
See application file for complete search history.

(56) References Cited

U.S. PATENT DOCUMENTS

| | | | | |
|---|---|---|---|---|
| 2,858,734 A * | 11/1958 | Boyd | ........................... | 359/593 |
| 4,114,186 A | 9/1978 | Dominguez | ................... | 362/35 |
| 4,306,769 A * | 12/1981 | Martinet | ...................... | 359/597 |
| 5,027,566 A | 7/1991 | Gilowski | ........................ | 52/18 |
| 5,175,967 A | 1/1993 | Greenwood | ................... | 52/200 |
| 5,544,455 A | 8/1996 | DeBlock | | |
| 5,596,848 A * | 1/1997 | Lynch | ........................... | 52/200 |
| 5,896,712 A | 4/1999 | Chao | ............................ | 52/200 |
| 5,896,713 A * | 4/1999 | Chao et al. | ..................... | 52/200 |
| 5,983,581 A * | 11/1999 | DeBlock et al. | ............... | 52/200 |
| RE36,496 E | 1/2000 | Sutton | .......................... | 52/200 |
| 6,044,592 A | 4/2000 | Strieter | .......................... | 52/27 |
| 6,219,977 B1 * | 4/2001 | Chao et al. | ..................... | 52/200 |
| 6,256,947 B1 * | 7/2001 | Grubb | ........................... | 52/200 |
| 6,351,923 B1 * | 3/2002 | Peterson | .................. | 52/786.13 |
| 6,363,667 B2 * | 4/2002 | O'Neill | ......................... | 52/200 |
| 6,385,922 B1 | 5/2002 | Mors | ........................... | 52/173.3 |
| D464,436 S | 10/2002 | Hoy et al. | ..................... | D25/52 |
| 6,604,329 B2 * | 8/2003 | Hoy et al. | ..................... | 52/200 |
| 6,813,864 B2 * | 11/2004 | Landis | ......................... | 52/200 |
| 6,990,773 B2 * | 1/2006 | Borges | ......................... | 52/200 |
| 2001/0013207 A1 | 8/2001 | O'Neill | ......................... | 52/200 |
| 2002/0051297 A1 | 5/2002 | Hoy et al. | ..................... | 359/597 |
| 2003/0066254 A1 * | 4/2003 | DeBlock | ....................... | 52/200 |
| 2003/0079422 A1 * | 5/2003 | Bracale | ....................... | 52/200 |
| 2004/0000107 A1 * | 1/2004 | Landis | ......................... | 52/200 |
| 2005/0039410 A1 * | 2/2005 | Hoy et al. | ..................... | 52/200 |
| 2006/0191214 A1 * | 8/2006 | Rillie | .......................... | 52/200 |

OTHER PUBLICATIONS http://www.sophiecurtis.co.uk/index.php?id=20.*

\* cited by examiner

*Primary Examiner*—Richard E Chilcot, Jr.
*Assistant Examiner*—Ryan D Kwiecinski
(74) *Attorney, Agent, or Firm*—Deborah A. Peacock; Hilary A. Noskin; Peacock Myers, P.C.

(57) ABSTRACT

A skylight system comprising a tapered light tube with the taper wider at the top than at the bottom and a permanently sealed skylight system. A diffused top dome and a diffuser bottom are attached to the light tube on site. No typical roof flashing is required during installation.

40 Claims, 3 Drawing Sheets

7,757,444 B1

SKYLIGHT SYSTEM

CROSS-REFERENCE TO RELATED APPLICATIONS

This application claims the benefit of the filing of U.S. Provisional Patent Application Ser. No. 60/444,128, entitled "Skylight", filed on Jan. 31, 2003, and the specification thereof is incorporated herein by reference.

BACKGROUND OF THE INVENTION

1. Field of the Invention (Technical Field)

The present invention relates, generally, to a method and apparatus for a tapered tubular skylight system and a permanently sealed skylight system.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

With a typical tubular skylight, a hole is cut into the roof of the structure and a flashing is then secured over the hole. A reflective cylindrical light tube is lowered through the flashing with a clear dome attached to the top. Inside, a diffuser is added to the bottom of the light tube along with safety wires that connect the diffuser to the ceiling, thus allowing natural light to enter the building.

There are many problems with this type of system, namely product design, wasted installation time, shipping and storage. Installing a clear outer dome causes much of the early morning, evening, and low winter light to pass through the dome, not down the light tube. When a reflector is used in the dome to catch low angled light, it will also deflect some light from the light tube during peak summer hours. Securing the outer dome to the flashing with screws or bolts consumes time and tends to crack the outer dome at the points of pressure. Also, in this area where the dome meets the flashing, small holes or slits are used in an effort to keep out condensation that builds up inside tubular skylight systems. The holes allow the system to breathe, exhaling in the heat of the day, and inhaling moisture, dust, bugs, and other contaminates at night, which in time ruins the highly reflective light tube.

A flashing has two purposes, to provide a base to attach the light tube and dome, and to cover up mistakes made in cutting the hole in the roof by the installer. The flashing is a waste of time and money. The light tube's straight cylindrical shape causes many problems. If shipped to the job site already assembled, much space is taken up for this shipping. If the assembly is done on the job, usually a foil tape is used, which has been shown to undo over time. Therefore, safety wires must be installed on the inside of the building connecting the bottom of the tube to the ceiling to prevent the tube from falling. This causes a safety hazard and is unsightly.

The present invention overcomes these problems by providing a permanently sealed, tubular skylight system with a fully diffused (e.g. polycarbonate) outer dome, and a tapered light tube. No flashing is necessary, it is easily assembled on site, and easy to ship and store.

A tapered skylight system is described in U.S. Pat. No. 6,363,667, entitled "Passive Collimating Tubular Skylight," to O'Neill. However, the taper is wider at the bottom than at the top.

American Manufacturing & Marketing System produces a "Square-Flex" skylight system with a flexible light tube.

A skylight system with a higher back than front is disclosed in U.S. Pat. No. 6,604,329, entitled "Light Conducting Tube for a Skylight," to Hoy et al. However, the skylight is cut on site to match the pitch of the roof.

Several patents show various features of skylights and other roof accessories as follows: U.S. Design Pat. No. D464,436, entitled "Collapsible Skylight Tube Having Open Ends and a Light Reflecting Inner Surface," to Hoy et al., shows a collapsible skylight with an light reflecting inner surface. U.S. Patent Publication No. US 2002/0051297, entitled "Light Conducting Tube for a Skylight," to Hoy et al., also shows a light tube with light reflecting inner surfaces. U.S. Pat. No. 6,385,922, entitled "Solar Light Receiving and Side Emitting System," to Mors, also discloses a skylight system with light reflecting interior surfaces. U.S. Pat. No. 5,896,712, entitled "Light-Collecting Skylight Cover," to Chao, describes a skylight system with light redirecting and a diffuser. U.S. Patent Application Publication No. US 2003/0079422, entitled "Tubular Skylight for Lighting Rooms with Natural Light," to Bracale, discloses a skylight with reflective inner surfaces and a diffuser. U.S. Pat. No. Re. 36,496, entitled "Skylight," to Sutton, describes a skylight with a reflector. U.S. Pat. No. 5,175,967, entitled "Natural Light Distributing Apparatus," to Greenwood, discloses a skylight tube with mirrored interior surfaces. U.S. Pat. No. 5,027,566, entitled "Window with Reflective Enclosure," to Gilowski, describes a window/light tube arrangement. U.S. Pat. No. 4,114,186, entitled "Lighting Fixture," to Dominguez, discloses a skylight with a liftable lid. U.S. Pat. No. 6,256,947, entitled "Method and Apparatus for a Tubular Skylight System," to Grubb, discloses using a prismatic diffuser. U.S. Pat. No. 6,044,592, entitled "Nest of Curbs," to Strieter, describes a nest of roof curbs for roof-top mounting of equipment.

None of these prior art systems describe a tapered skylight, with the taper being wider at the top than the bottom. Nor do any of these prior art system disclose a permanently sealed skylight system.

BRIEF SUMMARY OF THE INVENTION

The present invention relates to a skylight system. The preferred skylight system comprises a tapered light tube comprising a top and a bottom, with the taper wider at the top than at the bottom. The skylight system further preferably comprises a dome at the top of the light tube. This dome preferably comprises a diffused dome, and most preferably a completely diffused dome on its interior. The diffused dome also preferably comprises a prismatic diffuser The skylight system also preferably comprises a diffuser at the bottom of the light tube. This diffuser preferably comprises complete diffusion on its interior. The bottom diffuser also preferably comprises a prismatic diffuser.

In the preferred embodiment, the skylight system comprises a tapered light tube, a top dome disposed at the top of the tapered light tube, and a bottom diffuser disposed at the bottom of the tapered light tube. The tapered light tube is preferably sealed to the top dome. Likewise, the tapered light tube is preferably sealed to the bottom diffuser. This results in a completely sealed skylight system.

The dome, the tapered tube and the bottom diffuser are each preferably stackable during shipping and storage with other similar components. The top dome and/or bottom diffuser preferably comprise a notch system. The tapered light tube is disposed within the notch system. This notch system may comprise a gasket.

The light tube preferably comprises a reflective interior.

The back of the top of the light tube may be higher than the front of the top of the light tube.

The present invention is also directed to a permanently sealed system, whether or not the light tube is tapered. In this embodiment, the skylight system comprises a light tube comprising a top and a bottom, a dome disposed at and sealed at the top of the light tube, a diffuser disposed at and sealed at the bottom of the light tube. This combination of the light tube, top dome and bottom diffuser are permanently sealed.

The light tube, dome and bottom diffuser are preferably as described above.

The present invention is also directed to a method of assembly of a skylight system on a roof. The skylight system, as described above, is utilized. The diffuser is disposed on the light tube at the bottom of the light tube. A hole is cut in the roof. The skylight system is lowered through the hole in the roof. Then, the dome is disposed atop the light tube.

The light tube may be tapered, as described above. In this case, when the skylight system is lowered through the roof, the roof stops the tapered light tube at the portion where the light tube taper is the same as the roof hole.

In the preferred embodiment, the diffuser is permanently sealed to the light tube. Likewise, the dome is preferably permanently sealed to the light tube. This results in a permanently sealed skylight system. The dome and/or diffuser may have a notch and gasket system, as described above, to assist in sealing the components together.

A primary object of the present invention is to provide a skylight system with excellent light characteristics that is easy to manufacture, store, ship and assemble.

A primary advantage of the present invention is that it requires no roof flashing materials, is safe, and is sealed.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention relates to a skylight system that has a tapered light tube that is wider at the top than at the bottom. The skylight system of the present invention is useful for commercial, industrial, residential structures, out-structures, sheds, or any structure requiring light.

Figure 1:
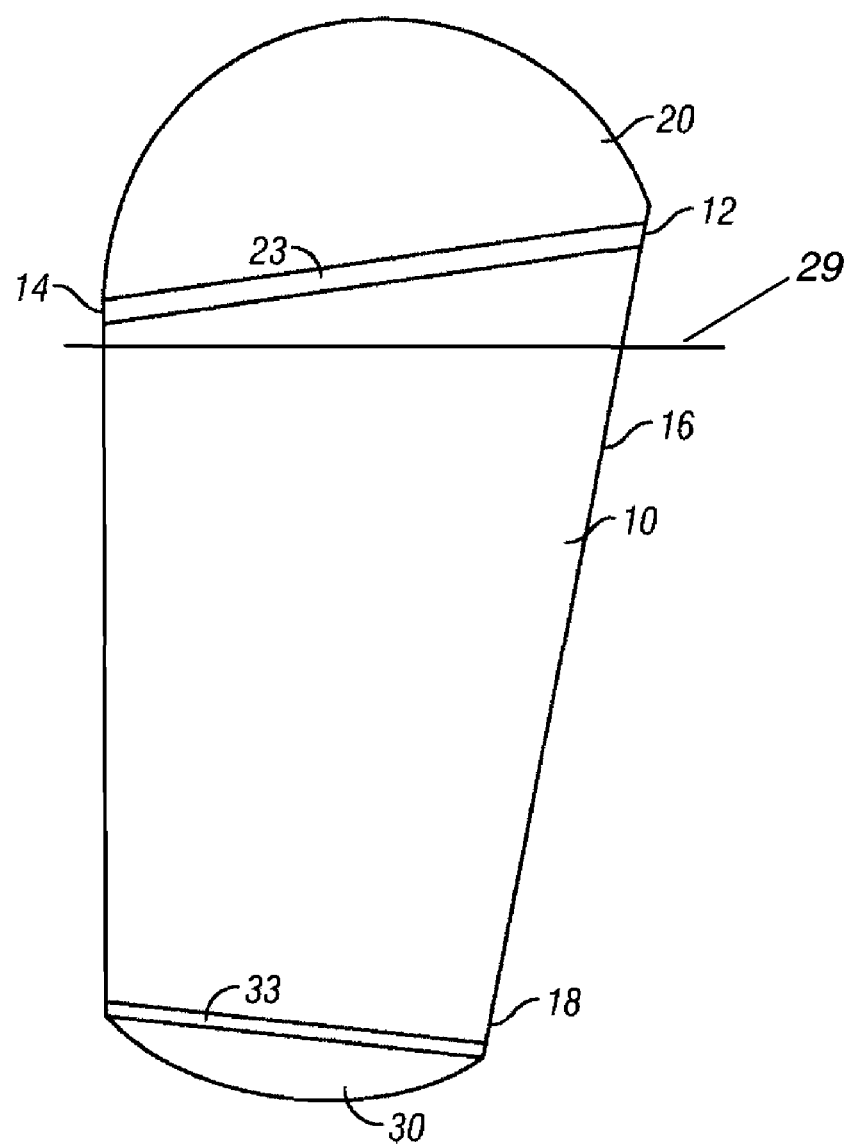
FIG. 1 is a side view of the preferred skylight system of the present invention, shown fully assembled.
Figure 2:
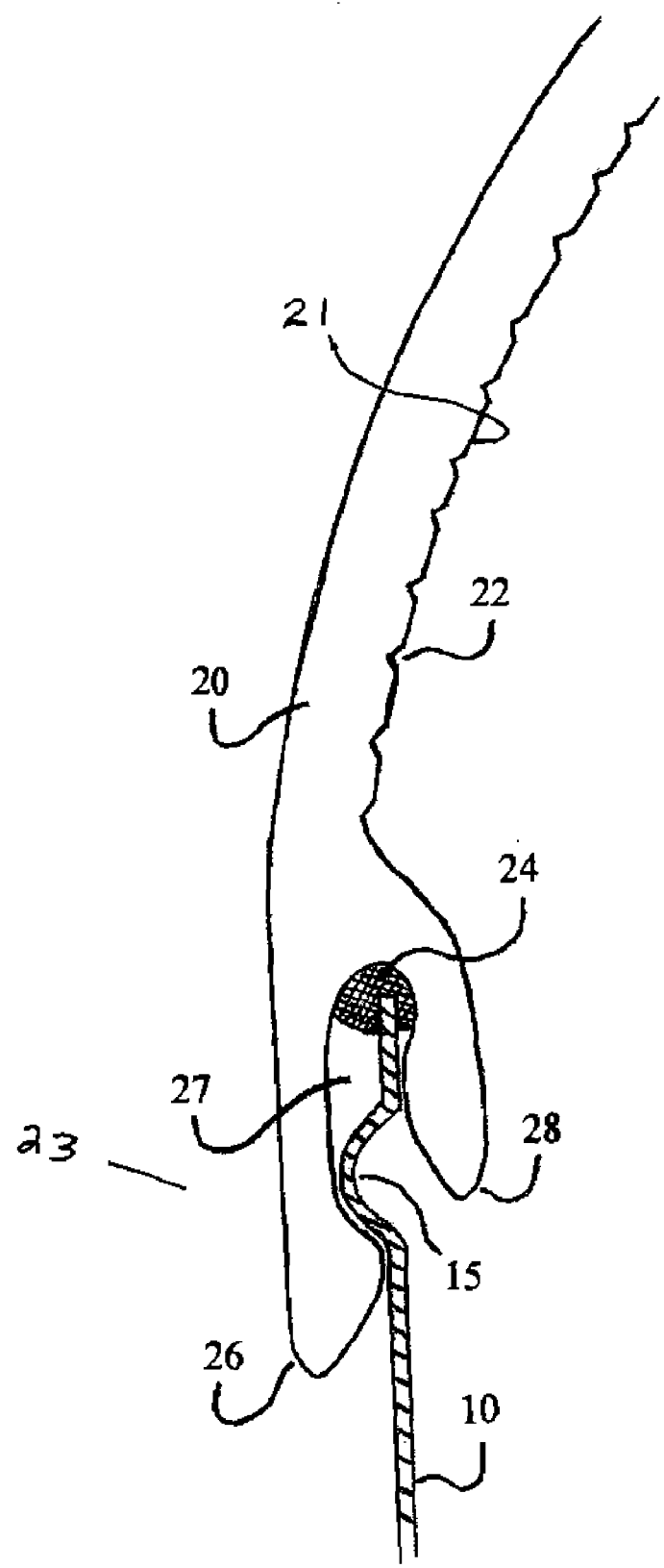
FIG. 2 is a cut-away view of the outer dome connected to the light tube of the FIG. 1 embodiment.
Figure 3:
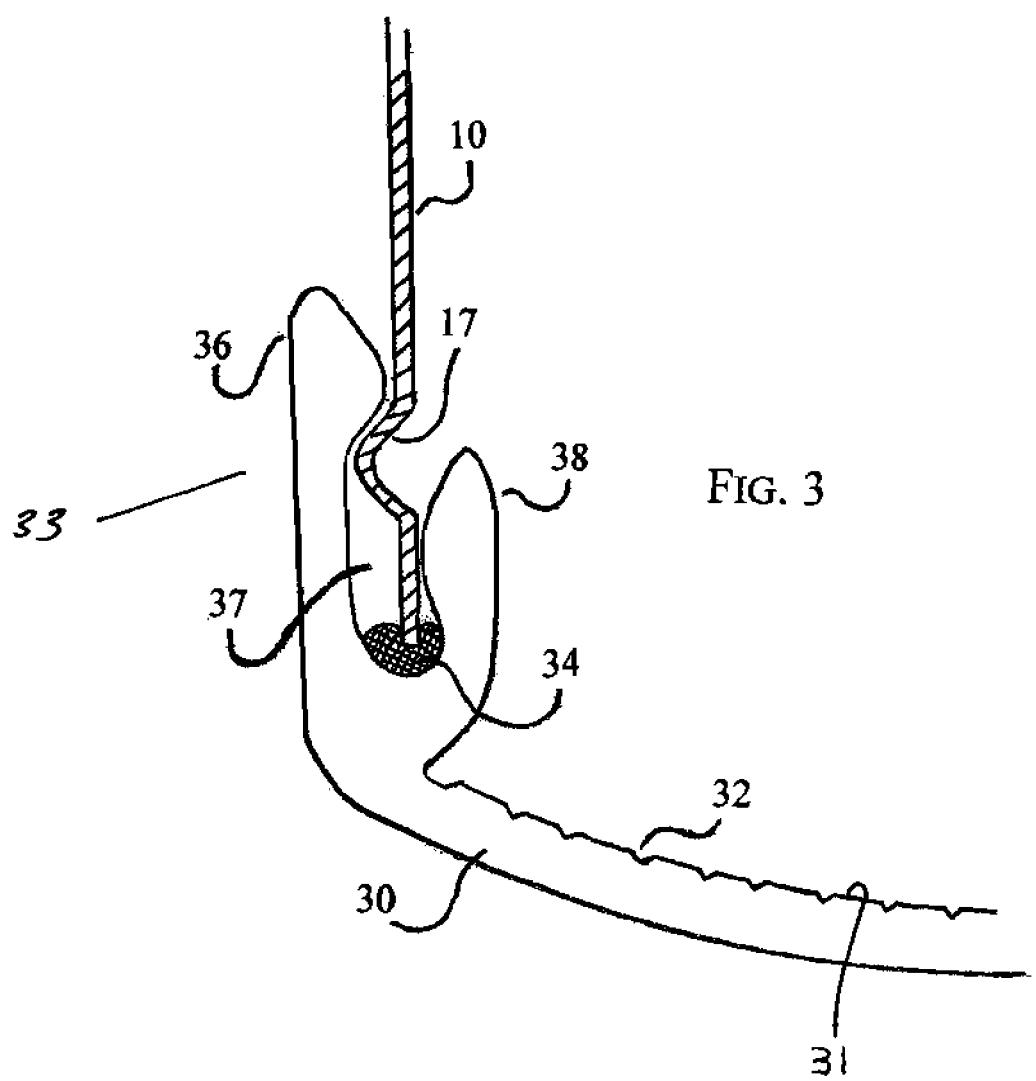
FIG. 3 is a cut-away view of the bottom diffuser connected to the light tube of the FIG. 1 embodiment.

The preferred embodiment is shown in the drawings. As shown therein, FIG. 1 show the preferred skylight system in an assembled configuration, showing light tube 10, outer dome 20, and bottom diffuser 30. FIG. 2 shows the preferred attachment of outer dome 20 to light tube 10. FIG. 3 shows the preferred attachment of bottom diffuser 30 to light tube 10.

As shown in FIGS. 1-3, skylight system comprises top dome 20 with dome lip 23; tapered light tube 10 with the taper wider at top 16 than at bottom 18; and bottom diffuser 30 with diffuser lip 33. The three separate components, top dome 20 (with dome lip 23), tapered light tube 10 and bottom diffuser 30 (with diffuser lip 33), are preferably shipped to the site and then assembled on site. Top dome 20 is snapped or sealed onto light tube 10. Likewise bottom diffuser 30 is snapped or sealed onto light tube 10. Inner lips 23 and 33 snugs light tube 10 to dome 20 and diffuser 30, respectively. This makes a fully assembled skylight system (see FIG. 1). This skylight system is then inserted into a roof hole until the taper of light tube 10 is stopped (due to it being wider at top 16 than at bottom 18) by the roof. The taper in light tube 10 makes it impossible to fall through the opening in the roof.

Since top dome 20 is a dome, it can be stacked with other similar domes for shipping and storage. Likewise, diffuser 30 has a dome or concave shape that can be easily stacked for shipping and storage. Also, tapered tube 10, due to its tapered shape, can be stacked within other tapered tubes for shipping and storage.

Light tube 10 is preferably permanently sealed at the factory. Light tube 10 is preferably made of a strong material, such as heavy gauge aluminum, steel, plastic, or other structural material. Light tube 10 preferably has highly reflective material inside (e.g. Spectralight, Mylar, acrylic, mirror, and the like, or just a highly polished surface, e.g. highly polished aluminum, etc.). Using heavy gauge aluminum permits the light tube to also serve as the "flashing," saving time and money. Shipping and storage are easy since one light tube can nest inside another light tube. Also, being tapered in shape allows it to be assembled at the factory using state of the art adhesives, insuring a permanent seal. Being permanently sealed with adhesives helps eliminate crack formations caused in polycarbonates by using screws, and prevents outside elements from tarnishing the highly reflective interior of the light tube. The light tube is preferably square or rectangular and tapered, and the interior surface of the light tube reflects the diffused light to bottom diffuser 30. Light tube 10 has a taper that is wider at top 16 than at bottom 18.

Top outer dome 20 is preferably fully or completely diffused. It should be made of an appropriate material for such diffusion, such as polycarbonate. Dome 20 is preferably made of a translucent structural material so that light can shine through. Outer dome 20 is preferably fully diffused, using a diffused pattern 22 on interior surface 21 (see FIG. 2), that extends completely along interior surface 21 of outer dome 20 to form a fully diffused dome 20, helping to channel or refract substantially more natural light into light tube 10 from low or high angles of the sun's rays. Outer dome 20 may be round in shape, a tapered flat shape, oval, flat, or any other shape desired.

FIGS. 2 and 3 illustrate how light tube 10 is preferably attached to top dome 20 (FIG. 2) and bottom diffuser 30 (FIG. 3), without the need for fasteners (e.g. screws, roof flashing, etc.). Concerning FIG. 2, light tube 10 has a raised dimple 15 used to hold outer dome 20 in place. Dome 20 with channel 27 holds gasket 24 (e.g. neoprene gasket). Out bottom lip 26 is built up to hold raised dimple 15 in place with pressure from inner lip 28. FIG. 2 also shows diffused texture 22 used on interior surface 21 of dome 20 other than dome lip area 23.

Outer dome 20 is preferably made of UV blocking material (e.g. polycarbonate) insuring many years of service. Top dome 20 is preferably fully diffused to capture exterior light from various angles and provides for more even lighting from bottom diffuser 30. This also helps reduce internal heat in the skylight system and the need for vent holes. Top dome 20 preferably comprises a prismatic material to diffuse exterior light rays into the light tube from all angles. Although the preferred embodiment provides for fully diffused top dome 20, the invention also contemplates partial or no diffusion for the top dome.

The interior surfaces of light tube 10 reflect diffused light to bottom diffuser 30. As the light leaves bottom diffuser 30, it illuminates the surroundings. Bottom diffuser 30 is made of a diffuser material and preferably has a prismatic diffuser inside to produce excellent light quality. Bottom diffuser 30 should be made of an appropriate material for such diffusion, such as acrylic. Bottom diffuser 30 is preferably made of a translucent structural material so that light can shine through. Bottom diffuser 30 is also preferably rounded or squared and tapered, and it is preferably sealed to the light tube 10 so that it does not gather insects or dust.

In the preferred embodiment, shown in FIG. 1, tapered light tube 10 has a higher back 12 than front 14. Dome 12 is configured to match sloping light tube 26. Dome 12 and diffuser 30 attach to tapered light tube 26, as described above. An embodiment of roof 29 is also shown in FIG. 1, where tapered light tube preferably directly contacts roof. This slope captures the sun's rays better, allowing for more light to travel through the skylight system. The lower front preferably points south to improve sunlight collection at higher latitudes during the winter months. A flatter light tube top can be used when installing closer to the equator. Although the preferred embodiment shows tapered light tube 10 with a higher back 12 than front 14, other configurations are useful in accordance with the present invention, and the invention is not limited to the configuration shown in the drawings. The top of the light tube may be flat, or the back of the light tube may be lower than the front of the light tube, depending on the building structure, roof system, direction towards the sun, etc.

At the job site, diffuser 30 and dome 20 with notched channels and neoprene gaskets are snapped onto light tube 10. Cement or sealants may be utilized to seal dome 20 and diffuser 30 to light tube 10, creating a permanently sealed unit. Adhesives may also be used to cement light tube 10 to the roof. Not using tape or screws eliminates condensation, dust, bugs or any other contaminates from affecting the highly reflective inside of the skylight system. This sealed system also acts as an excellent insulation barrier allowing minimal heat gains in the summer, or heat loss in the winter.

With the use of proper tools to cut a hole (square, rectangular, circular or other tubular configuration) in the roof, the skylight system is put into the hole without the fear of it falling, or the need for safety wires, or inside work. This is because of the taper of light tube 10 being wider at top 16 than at bottom 18. Using a square or rectangular-shaped light tube makes installation much easier because a square or rectangular shaped hole is easier to cut than a round hole. However, the invention is intended to cover any other shape of skylight that is preferred (e.g. round, oval, polygon, free-form, etc.). On pitched roofs, a rectangular hole is usually preferably, enabling the skylight system to remain plumb. The tapered skylight system, with bottom diffuser 30 already attached, is placed into the roof opening. A holding device may be temporarily placed inside light tube 10 at the roof level to firmly hold it against the roof. A high-speed wire wheel may be used the clean the area between the roof and light tube "flashing" before any adhesive is applied. Adhesive is then used to cement the skylight system to the roof. A first adhesive is preferably applied. After a second thicker application of adhesives has cured, the holding device may be removed, along with any interior protective film. Finally, top dome 20 is snapped into place and preferably fastened with adhesives, sealing the skylight system to complete the installation. From the ceiling, one preferably only sees bottom diffuser 30. From the roof top, one preferably sees top dome and at least a portion of light tube 10 (the portion of the taper that is wider than the roof opening). This portion of light tube 10 that can be seen on the roof can be minimized or maximized with the length of light tube 10 and taper of light tube 10, depending on what is desired.

With only the use of adhesives and/or snap-on features, a completely sealed installation is easily and quickly achieved. No flashing, screws, etc. are required to install, position, hold or seal the skylight system onto the roof. The tapered shape also allows for all work on the skylight system to be done on the roof, since no safety wires are needed to be attached from the bottom of the skylight system to the ceiling. Permanently sealing the unit provides advantages over tape as in the prior art (e.g. foil tape), which tends to deteriorate over time causing contamination of light tubes. Screws, tape, roofing tar and silicone may be eliminated, allowing for superior adhesives to be used. No safety wires are required to be attached from the ceiling to the light tube.

One embodiment allows use on structures with little or no space between the ceiling and the roof. This configuration is typical in large warehouse type buildings. Because of the need to direct light rays into the light tube, it has been found that by diffusing all the light before it enters the light tube reduces the internal heal, permitting one to use a shorter light tube, and still keep the bottom diffuser evenly lit. By using a prismatic diffuser for the complete interior of the top dome, three advantages are achieved: 1) it directs light rays from any angle down into the light tube; 2) It permits the use of a shorter light tube and still maintains an evenly lit bottom diffuser (this is because the light rays are broken up and deflected into different angles before entering the light tube); and 3) By softening the light rays with a diffused dome, internal heat is reduced to a point that no vent holes are required, making a totally sealed unit fully operational.

An inert gas (e.g. argon) may be put inside the light tube at the final sealing. A desiccant may be included to prevent condensation from forming inside the skylight system.

The skylight system of the present invention is an easy and economical unit to manufacture, ship, store and assemble. The square tapered light tube, with diffusers on the top and/or bottom of the system, and being permanently sealed, provide an improved skylight system, with a longer life. The system never requires the removal of the bottom diffuser to clean out dust and dead bugs. Most importantly, the skylight system produces an exceptional amount of light.

The skylight systems are constructed primarily with the roof thickness and slope in mind. The light tubes can therefore range from between 6" to 60" in height, and preferably approximately 30" in height for warehouse situations.

EXAMPLE

A skylight was constructed as follows. First, the completely prismatic top dome was made from polycarbonate plastic that was squared and tapered in shape with an inner lip that fit the light tube tightly to the dome. Second, a square flashing light tube that was tapered, from a larger top to a smaller bottom, was made from heavy gauge sheet aluminum, which became the "flashing" and the highly reflective interior surface. Next, a bottom diffuser was cemented with sealants to the aluminum light tube to create a permanently sealed unit. The dimensions of this skylight were 24"×24"×5" height for the top dome; 24"×24" at the top of the taper, 20"×20" on the bottom, and 30" in height; and the bottom diffuser was 20"×20"×2" depth.

Although the invention has been described in detail with particular reference to these preferred embodiments, other embodiments can achieve the same results. Variations and modifications of the present invention will be obvious to those skilled in the art and it is intended to cover all such modifications and equivalents.

What is claimed is:

1. A skylight system comprising:
    a tapered light tube comprising a tube comprising a top and a bottom and integral sides, said tapered light tube being straight-sided along its entire length and wider at said top than at said bottom;
    said light tube intersecting with a roof to stop and seal said light tube with the roof;
    said light tube having direct contact with an opening in the roof and sealing the roof without use of flashing;
    said light tube closed at said top and at said bottom; and
    a skylight at said top of said tube.

2. The skylight system of claim 1 wherein said light tube further comprises a reflective interior.

3. The skylight system of claim 1 wherein a back of said top of said light tube is higher than a front of said top of said light tube.

4. The skylight system of claim 1 wherein said skylight comprises a dome.

5. The skylight system of claim 4 wherein said dome comprises a diffused dome.

6. The skylight system of claim 5 wherein said dome comprises a completely diffused dome on its interior.

7. The skylight system of claim 5 wherein said diffused dome comprises a manufactured randomly diffused dome.

8. The skylight system of claim 4 wherein said diffused dome comprises a prismatic diffuser.

9. The skylight system of claim 4 wherein said dome comprises a notch system and said tapered light tube is disposed within said notch system.

10. The skylight system of claim 9 wherein said notch system further comprises a gasket.

11. The skylight system of claim 1 further comprising a diffuser at said bottom.

12. The skylight system of claim 11 wherein said diffuser comprises complete diffusion on its interior.

13. The skylight system of claim 11 wherein said bottom diffuser comprises a prismatic diffuser.

14. The skylight system of claim 11 further comprising a skylight dome at said top and wherein said tapered light tube is sealed to said skylight dome and said tapered light tube is sealed to said bottom diffuser, resulting in a completely sealed skylight system.

15. The skylight system of claim 14 wherein each of said skylight, said tapered tube and said bottom diffuser are stackable during shipping and storage with other similar components.

16. The skylight system of claim 14 wherein said tapered light tube comprises a desiccant and an inert gas disposed therein.

17. The skylight system of claim 11 wherein said bottom diffuser comprises a notch system and said tapered light tube is disposed within said notch system.

18. The skylight system of claim 17 wherein said notch system further comprises a gasket.

19. The skylight system of claim 1 wherein said light tube comprises direct contact with the roof with no flashing required.

20. An installed skylight system on a roof comprising:
    a tapered light tube comprising a tube comprising a top and a bottom and integral sides, said tapered light tube being straight-sided along its entire length;
    said tube wider at said top than at said bottom;
    said light tube intersecting with the roof to stop and seal said light tube with the roof;
    said tapered, light tube directly contacting the roof and requiring no flashing;
    a diffused dome disposed at and sealed at a top of said light tube;
    a diffuser disposed at and sealed at a bottom of said light tube; and
    said combination of said light tube, said top dome and said bottom diffuser permanently sealed.

21. The skylight system of claim 20 wherein said diffused dome comprises a prismatic diffuser.

22. The skylight system of claim 20 wherein said bottom diffuser comprises complete diffusion on its interior.

23. The skylight system of claim 20 wherein said bottom diffuser comprises a prismatic diffuser.

24. The skylight system of claim 20 wherein said top dome comprises a notch system and said light tube is disposed within said notch system.

25. The skylight system of claim 24 wherein said notch system further comprises a gasket.

26. The skylight system of claim 20 wherein said bottom diffuser comprises a notch system and said light tube is disposed within said notch system.

27. The skylight system of claim 26 wherein said notch system further comprises a gasket.

28. The skylight system of claim 20 wherein said light tube further comprises a reflective interior.

29. The skylight system of claim 20 wherein a back of said top of said light tube is higher than a front of said top of said light tube.

30. The skylight system of claim 20 wherein said light tube comprises a desiccant and an inert gas disposed therein.

31. The skylight system of claim 20 wherein said dome comprises a diffused dome.

32. The skylight system of claim 31 wherein said dome comprises a completely diffused dome on its interior.

33. The skylight system of claim 20 wherein said diffused dome comprises a manufactured randomly diffused dome.

34. A method of assembly of a skylight system on a roof comprising:
    providing a skylight system comprising a tapered light tube, straight-sided along its entire length, with a top and a bottom and integral sides;
    the light tube wider at the top than at the bottom;
    disposing a diffuser to the light tube at the bottom of the light tube;
    cutting a hole in the roof;
    lowering the skylight system through the hole in the roof;
    contacting the tube directly with the roof using no flashing;
    stopping the lowering of the skylight system at a roof intersect thereby sealing said light tube with the roof;
    and disposing a completely diffused dome atop the light tube.

35. The method of claim 34 wherein providing a tapered light tube comprises the top of the tapered light tube being wider than the bottom of the light tube; and
    wherein lowering the skylight system through the roof comprises lowering the skylight system until the roof stops the tapered light tube at the portion where the light tube taper is a same size as the roof hole.

36. The method of claim 34 wherein disposing a diffuser to the light tube comprises permanently sealing the diffuser to the light tube; and wherein disposing a dome atop the light tube comprises permanently sealing the dome atop the light tube; resulting in a permanently sealed skylight system.

37. The method of claim 34 wherein disposing the dome atop the light tube comprises providing a dome with a notch system and disposing the light tube within the notch system.

38. The method of claim 34 wherein disposing the diffuser at the bottom of the light tube comprises providing a diffuser with a notch system and disposing the light tube within the notch system.

39. The method of claim 34 further comprising adhering the light tube to the roof.

40. The method of claim 34 wherein disposing a completely diffused dome atop the light tube comprises disposing a manufactured completely and randomly diffused dome atop the light tube.

\* \* \* \* \*